(12) United States Patent
Marsh et al.

(10) Patent No.: US 8,774,971 B2
(45) Date of Patent: Jul. 8, 2014

(54) SYSTEMS AND METHODS FOR STRUCTURE CONTOUR CONTROL

(75) Inventors: Bobby Joe Marsh, Lake Stevens, WA (US); Kinson D. VanScotter, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 586 days.

(21) Appl. No.: 12/697,752

(22) Filed: Feb. 1, 2010

(65) Prior Publication Data

US 2011/0190941 A1 Aug. 4, 2011

(51) Int. Cl.
G05D 15/00 (2006.01)

(52) U.S. Cl.
USPC .......................................... 700/275; 700/303

(58) Field of Classification Search
USPC ........... 700/95, 105, 108, 109, 110, 159, 163, 700/171, 172, 173, 174, 182, 186, 187, 193, 700/275, 303; 702/81, 82, 83, 84, 155, 167, 702/168, 182
See application file for complete search history.

(56) References Cited

U.S. PATENT DOCUMENTS

| | | | |
|---|---|---|---|
| 4,081,992 A | 4/1978 | Aurora et al. | |
| 4,718,842 A | 1/1988 | Labbe et al. | |
| 4,736,633 A | 4/1988 | Duppong et al. | |
| 4,805,652 A | 2/1989 | Hartley et al. | |
| 4,812,984 A | 3/1989 | Yerly et al. | |
| 5,026,245 A | 6/1991 | Sabo | |
| 5,374,025 A | 12/1994 | Whelpley et al. | |
| 5,580,095 A | 12/1996 | Fukumoto | |
| 5,593,791 A | 1/1997 | D'Annuzio et al. | |
| 5,596,144 A | 1/1997 | Swanson | |
| 5,970,665 A | 10/1999 | Oudman | |
| 6,027,398 A * | 2/2000 | Numoto et al. | 451/285 |
| 6,088,642 A * | 7/2000 | Finkelstein et al. | 701/49 |
| 6,094,762 A * | 8/2000 | Viard et al. | 5/713 |
| 6,098,000 A * | 8/2000 | Long et al. | 701/49 |

(Continued)

FOREIGN PATENT DOCUMENTS

WO WO 0113767 3/2001
WO WO 2009128992 10/2009

OTHER PUBLICATIONS

SAE International Paper 2009-01-3088 entitled, "Laser Tracker and Digital Photogrammetry's Merged Process for Large Scale Rapid Scanning." Authored by Bobby J. Marsh and published on Nov. 2009; 8 pages.

(Continued)

*Primary Examiner* — Charles Kasenge
(74) *Attorney, Agent, or Firm* — Hope Baldauff, LLC

(57) ABSTRACT

Systems and methods provide for the controlled application of forces to a structure during assembly, machining, manufacturing, and/or transportation operations. According to embodiments described herein, a contour control system includes a number of force control modules that are communicatively linked to a control system. The control system receives or retrieves data indicating the shape of the structure and a shape associated with a desired structure, and determines if the structure is consistent with the design specifications and any associated tolerances. The control system controls the force control modules to apply calculated forces to the structure to control the contours of the structure and/or to maintain the structure in a desired configuration. According to embodiments, the force control modules include support cradles, air cushion pads, vacuum cups, and/or other structures for selectively applying dynamic and/or static forces to the structure.

19 Claims, 12 Drawing Sheets

(56) References Cited

U.S. PATENT DOCUMENTS

| | | | |
|---|---|---|---|
| 6,193,442 B1 | 2/2001 | May | |
| 6,199,427 B1 | 3/2001 | Kroll et al. | |
| 6,203,105 B1 * | 3/2001 | Rhodes, Jr. | 297/284.6 |
| 6,384,715 B1 * | 5/2002 | Potter | 340/407.1 |
| 6,422,087 B1 * | 7/2002 | Potter | 73/731 |
| 6,427,538 B1 * | 8/2002 | Potter | 73/706 |
| 6,560,804 B2 * | 5/2003 | Wise et al. | 5/713 |
| 6,640,685 B2 | 11/2003 | Hamby | |
| 6,776,692 B1 * | 8/2004 | Zuniga et al. | 451/41 |
| 6,923,599 B2 | 8/2005 | Kelso | |
| 7,150,673 B2 * | 12/2006 | Sakurai et al. | 451/5 |
| 7,152,920 B2 * | 12/2006 | Sugiyama et al. | 297/284.6 |
| 7,208,896 B2 | 4/2007 | Ford et al. | |
| 7,226,057 B2 | 6/2007 | Eichhorn et al. | |
| 7,459,645 B2 * | 12/2008 | Skinner et al. | 177/144 |
| 7,493,194 B2 | 2/2009 | Venugopal | |
| 7,503,251 B2 | 3/2009 | Kawaguchi et al. | |
| 7,534,077 B2 * | 5/2009 | Ban et al. | 409/126 |
| 7,617,018 B2 | 11/2009 | Ford et al. | |
| 7,670,206 B2 * | 3/2010 | Togawa et al. | 451/10 |
| 7,672,817 B2 | 3/2010 | Marsh et al. | |
| 7,714,238 B2 * | 5/2010 | Skinner et al. | 177/144 |
| 7,756,321 B2 | 7/2010 | Marsh et al. | |
| 7,787,979 B2 | 8/2010 | Marsh et al. | |
| 7,957,531 B2 | 6/2011 | Collina et al. | |
| 8,125,173 B2 | 2/2012 | Terashima et al. | |
| 2001/0039681 A1 * | 11/2001 | Johnson et al. | 5/713 |
| 2002/0144862 A1 | 10/2002 | Engvall et al. | |
| 2004/0046337 A1 | 3/2004 | Sproatt et al. | |
| 2004/0200327 A1 | 10/2004 | Baker | |
| 2004/0211945 A1 | 10/2004 | Maggiori | |
| 2005/0020185 A1 * | 1/2005 | Zuniga et al. | 451/5 |
| 2005/0093552 A1 | 5/2005 | Ahrikencheikh | |
| 2005/0159840 A1 * | 7/2005 | Lin et al. | 700/245 |
| 2005/0186691 A1 * | 8/2005 | Koike et al. | 438/14 |
| 2005/0211534 A1 | 9/2005 | Refend | |
| 2006/0009127 A1 * | 1/2006 | Sakurai et al. | 451/5 |
| 2006/0039768 A1 * | 2/2006 | Ban et al. | 409/96 |
| 2006/0059814 A1 | 3/2006 | Metz et al. | |
| 2006/0188329 A1 | 8/2006 | Cobb, Jr. | |
| 2006/0196283 A1 * | 9/2006 | Yang et al. | 451/8 |
| 2007/0174964 A1 | 8/2007 | Lemire et al. | |
| 2007/0175016 A1 | 8/2007 | Sievers et al. | |
| 2007/0189887 A1 | 8/2007 | Lindblom | |
| 2007/0205405 A1 | 9/2007 | Stockmaster et al. | |
| 2007/0269295 A1 | 11/2007 | Guenther | |
| 2007/0272450 A1 * | 11/2007 | Skinner et al. | 177/144 |
| 2008/0006806 A1 | 1/2008 | Hall et al. | |
| 2008/0114500 A1 | 5/2008 | Hull et al. | |
| 2008/0139087 A1 * | 6/2008 | Togawa et al. | 451/8 |
| 2008/0314649 A1 | 12/2008 | Hansen | |
| 2009/0050413 A1 | 2/2009 | Nilsson | |
| 2009/0138126 A1 | 5/2009 | Marsh et al. | |
| 2009/0272952 A1 | 11/2009 | Alguera | |
| 2010/0044978 A1 | 2/2010 | Delorenzis et al. | |

OTHER PUBLICATIONS

U.S. Office Action dated Mar. 17, 2010 in U.S. Appl. No. 11/944,872.
U.S. Office Action dated Sep. 29, 2010 in U.S. Appl. No. 11/944,872.
U.S. Office Action dated May 10, 2012 in U.S. Appl. No. 11/944,872.
Nova-Tech Engineering, Inc., http://web.archive.org/web/20110207030356/http://www.ntew.com/Archived Oct. 10, 2007, Printed Feb. 3, 2012.
U.S. Office Action dated Jun. 19, 2013 in U.S. Appl. No. 11/944,872.
Extended European Search Reported dated Oct. 30, 2013 in EP Application Serial No. 11152746.1.
Notice of Allowanced dated Nov. 29, 2013 in U.S. Appl. No. 11/944,872.

* cited by examiner

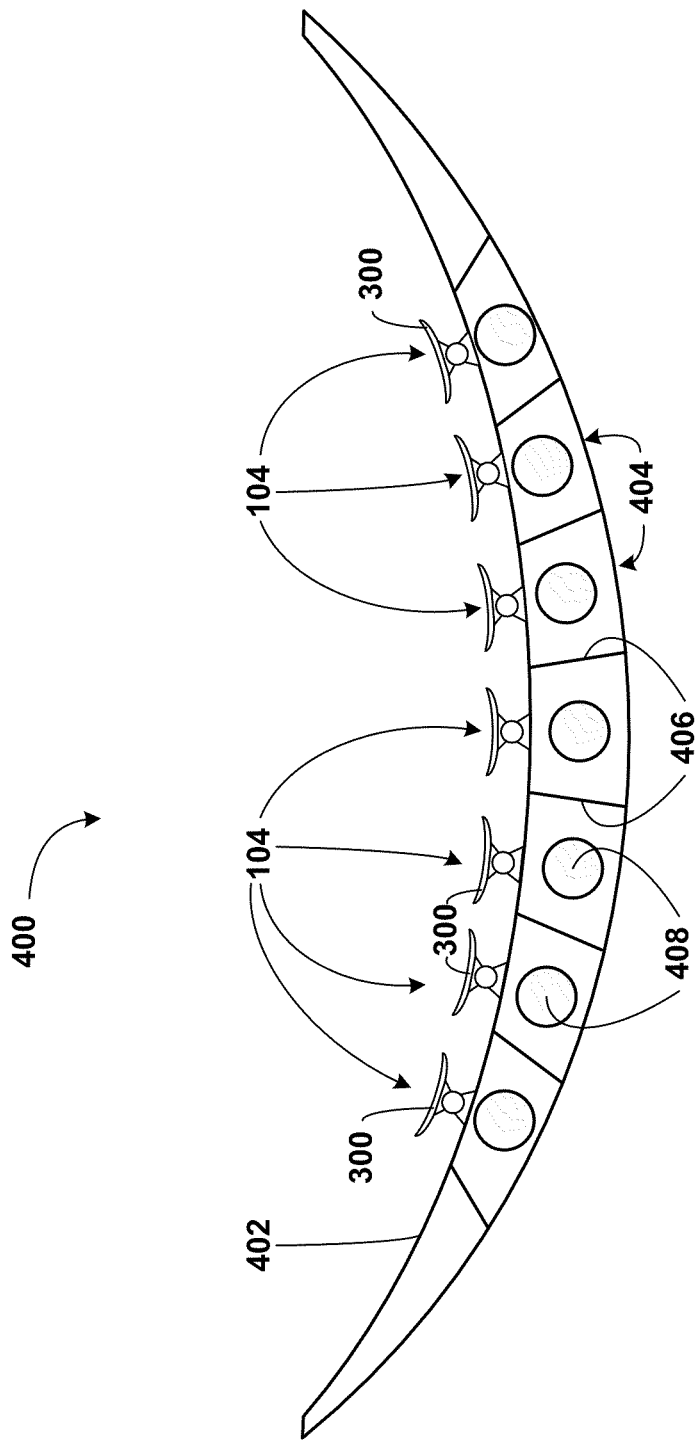

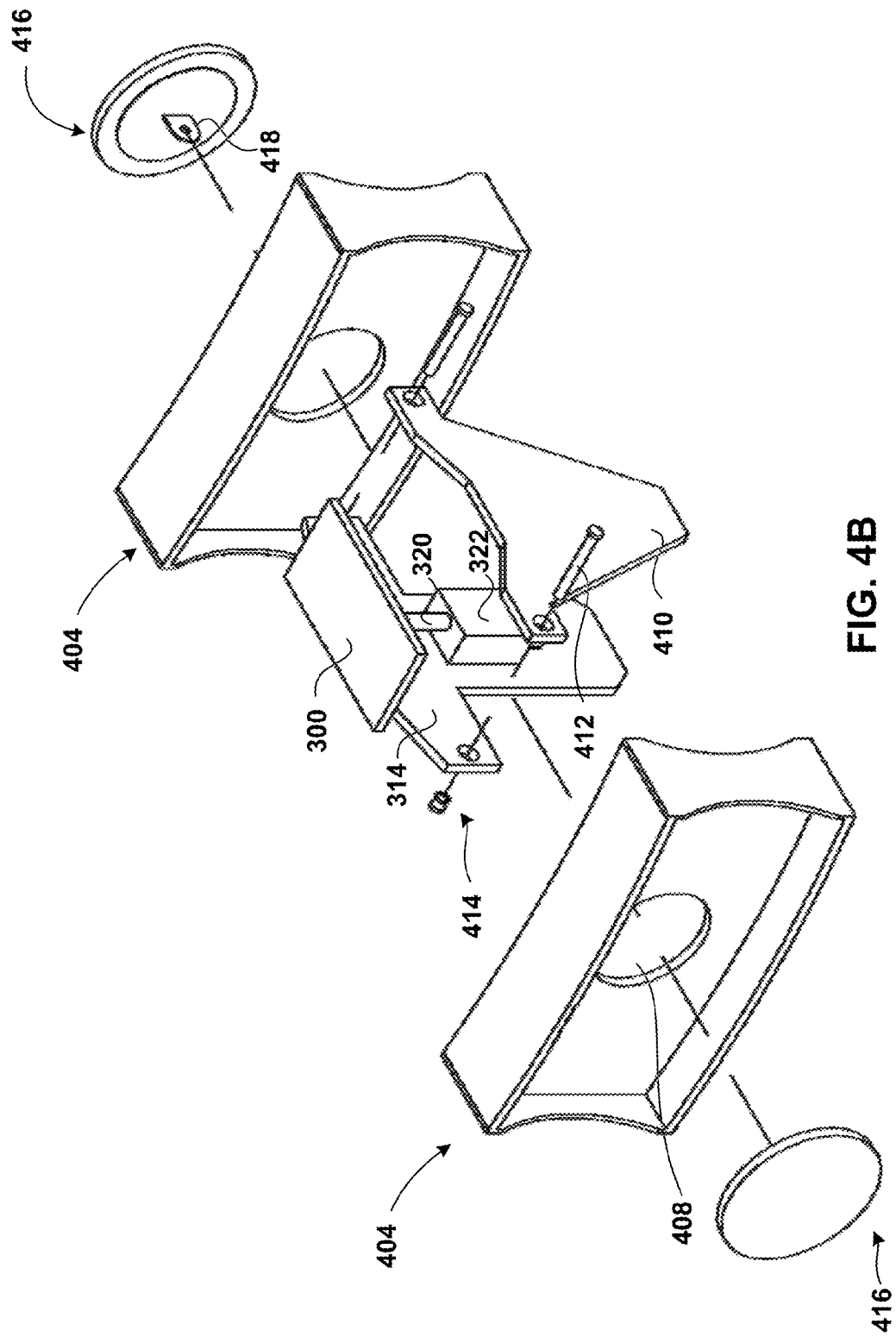

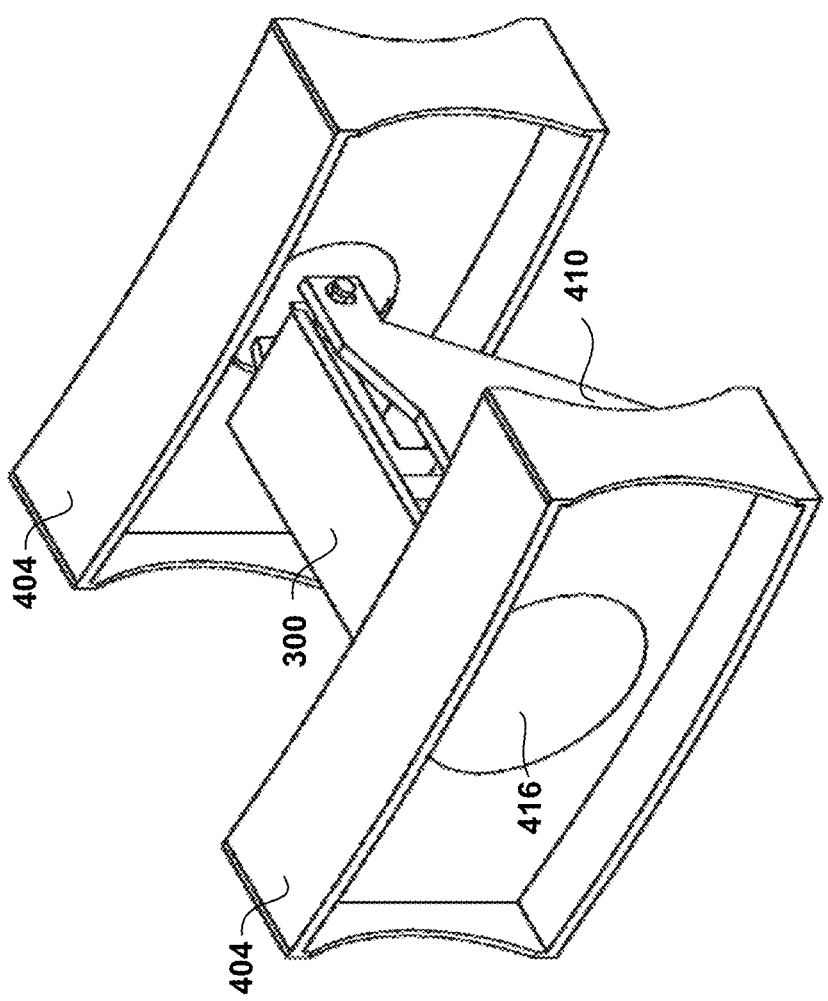

SYSTEMS AND METHODS FOR STRUCTURE CONTOUR CONTROL

TECHNICAL FIELD

The present disclosure relates generally to structure control and, more particularly, to applying, monitoring, and adjusting forces to a structure to control structure contours.

BACKGROUND

When assembly, machining, manufacturing, and/or transporting large structures, it is often necessary to ensure that the contours of the structure are consistent with a desired structure design and/or associated tolerances. In the case of assembling two or more large structures together to form a product, the importance of precisely forming the respective structures is important for efficient manufacturing as well as quality control. Assembling, machining, manufacturing, and/or transporting large structures that meet desired design characteristics may be difficult due to internal and external factors. For example, structure contour deviations may be realized due to certain aspects of the desired design, the materials used, the manufacturing processes used, the machinery used, and/or other factors. Additionally, a well-formed or assembled structure may be subject to internal and/or external forces that cause changes in the structure dimensions. Internally, a structure may include stresses induced during manufacturing that alter the shape of the structure, even after manufacturing of the structure is completed. Externally, the structure may be subjected to minor or even significant changes induced by movement, shifts in the earth, transportation forces, damage, other, or other forces.

The above considerations are compounded by modern manufacturing processes, wherein a structure may be initially formed at one facility, and may then pass to or through a number of other facilities. In some cases, the structure must be transported large distances, even between multiple continents, between the time the first manufacturing process is performed on the structure and the time at which the structure is a part of, or is itself, a finished product. The transportation of the structure often introduces new forces to the structure, possibly resulting in deformation of the structure. Furthermore, even if deformation is not induced by the multiple possible transportations, a first manufacturing facility may be aware of certain structure characteristics of which a second manufacturing facility is unaware. Thus, a second facility may undertake steps to collect data already collected at a first facility.

SUMMARY

It should be appreciated that this Summary is provided to introduce a selection of concepts in a simplified form that are further described below in the Detailed Description. This Summary is not intended to be used to limit the scope of the claimed subject matter.

Systems and methods described herein provide for the determination of the contours of a structure, an analysis of the contours and/or comparison of the contours to a desired design and associated tolerances, and the controlled application and management of forces to the structure for precision assembly, machining, and/or manufacturing. Additionally, the contours of the structure may be controlled during transportation to detect, and in some instances correct, deformation of the structure during transportation. The embodiments disclosed herein provide for a contour control system that includes contour measurement modules and force control modules to measure contours of a structure. In addition to inputting data to the contour control system, the force control modules can be controlled by the contour control system and/or a control system thereof. The control system is operative to determine what forces, if any, should be applied to a structure to obtain the desired contours. The control system also is operative to control the force control modules to apply the determined forces, and to monitor the applied forces to ensure that the forces remain within acceptable limits. If internal or external factors result in any change in the structure and/or the forces sensed by or applied by the contour control system, the contour control system is able to compensate for these changes by adjusting the amount of force applied by the force control modules. In this manner, the embodiments described herein allow for continuous structure contour monitoring and control.

According to various embodiments, a contour control system is provided for controlling a contour of a structure. The system includes a force control module operative to apply a force to the structure, and a control system communicatively linked to the force control module. The control system includes a processor functionally coupled to a memory. The memory includes computer-readable instructions executable by the processor to make the contour control system operative to obtain actual contour data indicating the configuration and location of the contour, and to receive target contour data associated with a desired structure. The target contour data includes data indicating a desired location and configuration of the contour, and a pre-defined tolerance associated with the desired location and configuration of the contour. The memory further includes computer-readable instructions executable by the processor to make the contour control system further operative to analyze the actual contour data and the target contour data to determine if the location and configuration of the contour are within the pre-defined tolerance of the desired location and configuration of the contour, and to determine a force to be applied by the force control module to control the location and configuration of the contour.

According to other embodiments described herein, a method for controlling a contour of a structure is provided. The method includes obtaining, with a measurement device, actual contour data. The actual contour data indicates at least one of a configuration of the contour and a location of the contour. The method further includes receiving, at a contour control system, target contour data associated with a desired structure. The target contour data includes data indicating at least one of a desired location of a contour, and a desired configuration of the contour. Additionally, the target contour data includes a tolerance associated with the contour. The method also includes analyzing the actual contour data and the target contour data to determine if the contour is consistent with the target contour data, and determining a force to be applied by a force control module to control the at least one of the location of the contour and the configuration of the contour. The method also includes activating the force control module to apply the determined force to the structure to control the at least one of the location of the contour and the configuration of the contour, and monitoring the structure to determine if an additional force should be applied to control the at least one of the location of the contour and the configuration of the contour.

According to further embodiments described herein, a method for controlling a contour of a structure is provided. The method includes receiving, at a contour control system, stored load data associated with the structure. The stored load data indicates a force applied to the structure by a force application device to control the contour, and a tolerance associated with the force. The method further includes obtaining, using a force sensor of a force control module, a structure load data indicating a force between the structure and the force control module. The method also includes analyzing the structure load data and the stored load data to determine if the structure load data is consistent with the stored load data and the tolerance, and determining a force to be applied by a force control module to match the stored load data and the tolerance. The method includes activating the force control module to apply the determined force to the structure, and monitoring the structure to determine if an additional force should be applied to the structure.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 4A illustrates a structure support cradle, according to an exemplary embodiment of the present disclosure.

FIGS. 4B-4D illustrate additional details of the structure support cradle and the FCM, according to exemplary embodiments of the present disclosure.

DETAILED DESCRIPTION

The following detailed description is directed to systems and methods for controlling the shape, e.g. the contours, of a structure, for example, an aerospace structure. In some embodiments, the contours of the structure are controlled during manufacturing, machining, assembly, and/or transportation. The embodiments described below provide a contour control system capable of using contour measurement devices to determine the contours of a structure, compare the structure contours with target contour data associated with a desired structure, and use a system of force control modules and support structures to apply forces to the structure to control the contours of the structure. Additionally, the contour control system includes, in some embodiments, a control system operative to monitor and control the forces applied to the structure by the force control modules and/or support structures.

Using these embodiments, precise forces may be applied to the structure at various locations to control the contours of the structure at a desired time, for example, during manufacturing and/or assembly of the structure. The contour control system is operative to continuously monitor and adjust the contours of the structure, thereby ensuring that the structure contours are maintained at or near an optimal configuration during manufacturing, transportation, assembly, or other operations, during which internal or external forces might otherwise shift the structure contours out of the desired configurations. In some embodiments, the forces applied by the force control modules are continuously monitored and adjusted to ensure that structural and/or material constraints are not exceeded and/or to prevent undesirable material and/or structure deformation.

Figure 1:
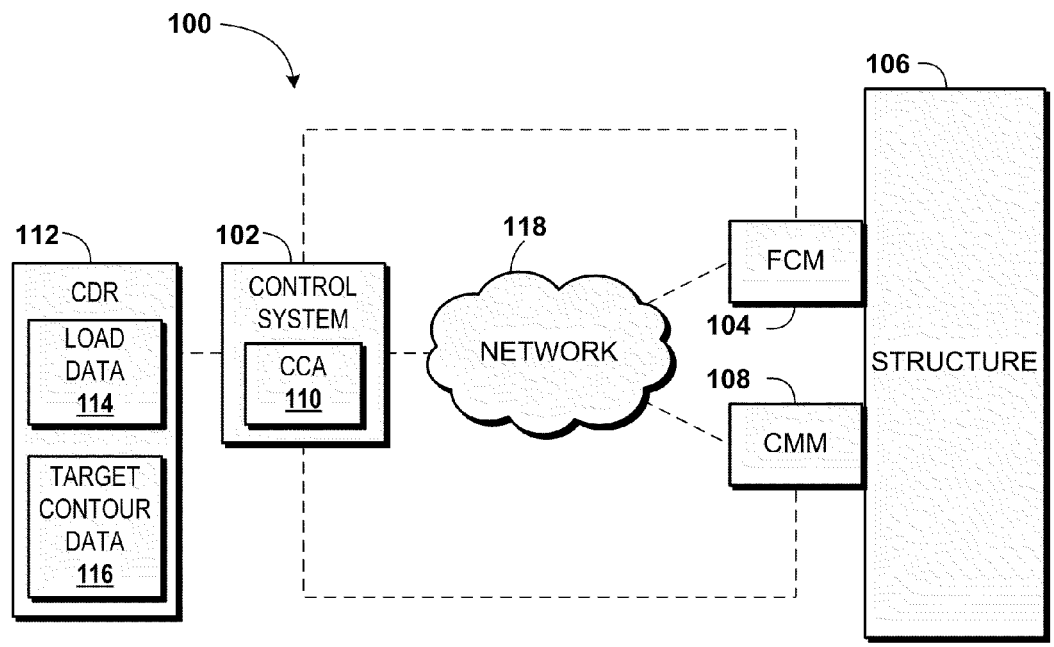
FIG. 1 is a block diagram showing elements of a contour control system, according to an exemplary embodiment of the present disclosure.

In the following detailed description, references are made to the accompanying drawings that form a part hereof, and which are shown by way of illustration, specific embodiments, or examples. Referring now to the drawings, in which like numerals represent like elements through the several figures, aspects of a contour control system will be described. FIG. 1 shows a contour control system 100, according to an exemplary embodiment of the present disclosure. The contour control system 100 includes a control system 102 that is communicatively linked to one or more force control modules 104 ("FCM's"), each of which is configured to apply a force to support, level, deform, manipulate, and/or otherwise control the contours of a structure 106. Throughout this disclosure, embodiments will be described in the context of the structure 106 being an aerospace structure such as a fuselage portion. It should be understood, however, that the technologies and concepts disclosed herein are applicable to other structures including, but not limited to, ships, hulls, automobile chassis, other vehicle components, and building or other architectural structures. In some embodiments, the control system 102 also is communicatively linked to one or more contour measurement modules 108 ("CMM's"), each of which is configured to measure the contours of the structure 106.

As will be described in greater detail below with reference to FIGS. 3A-6, according to some embodiments, the FCM's 104 include one or more air cushion contact pads configured to selectively apply a force to the structure 106. For example, the air cushion pads can be inflated to increase pressure within the air cushion pads, thereby applying a force to surfaces or points of the structure 106 in contact with the air cushion pads. Additionally, or alternatively, the air cushion pads can be deflated to decrease pressure within the air cushion pads, thereby reducing forces applied to the surfaces or points of the structure 106 in contact with air cushion pads. Suitable examples of the air cushion pads include, but are not limited to, various air load modules sold by AeroGo of Seattle, Wash. under the mark AEROGO LOAD MODULE™. It should be understood that air cushion pads and/or air load modules can be configured as flat pads, or can be molded to match or approximate a particular surface.

In some embodiments, the FCM's 104 include one or more vacuum cups configured to selectively apply a force to the structure 106. For example, the vacuum cups can be activated to increase negative pressure inside the vacuum cups at surfaces or points of the structure 106 in contact with the vacuum cups, thereby generating pulling forces at the surfaces or points of the structure 106. Additionally, or alternatively, the vacuum cups can be deactivated to decrease the negative pressure inside the vacuum cups, thereby reducing pulling forces at the surfaces or points of the structure 106. Suitable examples of the vacuum cups include, but are not limited to, various vacuum cups sold by Anver Corp. of Hudson, Mass. under the mark ANVER®, including model numbers VC119Q-GR and VC125Q-2-GR.

In some embodiments, the FCM's 104 include one or more structure support cradles configured to support the structure 106, thereby applying static forces to the surfaces or points of the structure 106. In some embodiments, the structure support cradle is equipped with and/or complimented by one or more air cushion contact pads and/or vacuum cups. Although not illustrated, it will be appreciated that the contour control system 100 may include air compressors, pressure sensors, air flow regulators, vacuum pumps, air lines, vacuum lines, and power supplies to operate and/or control the various components of the contour control system 100, including the FCM's 104 and structure support cradles and/or components thereof. It should be appreciated that the structure 106 may be any part, tool, or other structure that requires leveling and/or machining, and is not limited to an airplane fuselage or other aerospace structure.

As will be described in greater detail below with reference to FIG. 5A, according to some embodiments, the CMM's 108 include one or more measurement devices configured to measure the location of and/or a configuration of one or more surfaces, surface contours, and/or surface points of the structure 106. In some embodiments, the CMM's 108 include contactless measuring devices such as, for example, a laser radar or laser tracking device. Suitable examples of a CMM 108 include, but are not limited to, high-speed contactless laser scanners sold by Leica Geosystems, part of the Hexagon Group of Stockholm, Sweden, for example a high speed laser tracker sold under the mark LEICA ABSOLUTE TRACKER™, and laser radar devices sold by Metris, USA of Brighton, Mich. under the mark METRIS®, including model numbers MV224 and MV260. In some embodiments, the CMM's 108 include contact measurement devices such as, for example, actuators and precision drive systems capable of measuring exact location of surface point locations of a structure. In some embodiments, the CMM's 108 include a combination of contactless and contact measurement devices. It should be appreciated that the CMM's 108 may scan an entire surface of the structure 106, all surfaces of the structure 106, some contours of the structure 106, all contours of the structure 106, and/or selected points of the structure 106. In some embodiments, the CMM's 108 monitor certain points of the structure 106 that adequately illustrate the contours of the structure 106. The determination as to how many points, contours, and/or surfaces of the structure 106 will be monitored can be made using any known techniques, for example, finite element analysis.

The control system 102 may include any type of computing device capable of executing a contour control application 110. The contour control application 110 includes computer executable instructions executable by the control system 102 and/or a data processing device associated with the control system 102. Execution of the contour control application 110 makes the control system 102 operative to determine structure contours, for example, by retrieving and/or receiving data from the CMM's 108 or other devices. Execution of the contour control application 110 makes the control system 102 further operative to determine if data representing the actual structure contours ("actual contour data) of a structure 106 is consistent with data representing desired or targeted design contour data ("target contour data") of a structure 106 and/or associated tolerances. Additionally, execution of the contour control application 110 makes the control system 102 further operative to apply, monitor, and/or adjust forces applied to the structure 106 via the FCM's 104, as described with respect to various exemplary embodiments below. In some embodiments, the functions of the control system 102 are provided by a desktop computer, a notebook computer, a netbook, a personal data assistant, a smart phone, a hand-held portable computing device, or another computing device. The architecture associated with an exemplary control system 102 is described below with reference to FIG. 2.

The control system 102 and/or the contour control application 110 are communicatively linked to a contour data repository 112 ("CDR") configured to store load data 114 and/or target contour data 116. The load data 114 includes data corresponding to forces measured at and/or applied by the FCM's 104. The target contour data 116 includes data corresponding to and/or indicating targeted or desired contour data associated with the structure 106. The target contour data 116 can include, for example, a dataset representing desired design contour data of a structure 106 and/or associated tolerances. In some embodiments, the CDR 112 includes a database in communication with the control system 102 and/or the contour control application 110. In some embodiments, the CDR 112 includes a data storage location associated with the control system 102. Thus, it should be appreciated that the load data 114 and/or the target contour data 116 may be stored within the control system 102 and/or at a remote location accessible by the control system 102 and/or the contour control application 110.

The FCM's 104, the CMM's 108, and the control system 102 are configured in some embodiments to communicate with one another via a direct link and/or via a communications network 118. In some embodiments, the network 118 includes a wireless network such as, but not limited to, a Wireless Local Area Network ("WLAN") such as a WIFI® network, a Wireless Wide Area Network ("WWAN"), a Wireless Personal Area Network ("WPAN") such as BLUETOOTH, a Wireless Metropolitan Area Network ("WMAN") such a WIMAX® network, a cellular network, a satellite network, combinations thereof, and the like. In some embodiments, the network 118 includes a wired network such as, but not limited to, a wired Wide Area Network ("WAN") such as the Internet, a wired Local Area Network ("LAN") such as an intranet, a wired Personal Area Network ("PAN"), and/or a wired Metropolitan Area Network ("MAN"). In some embodiments, the network 118 includes one or more wired networks and/or wireless networks in communication with the Internet. Thus, some embodiments of the network 118 include a combination of wired and/or wireless technologies to provide connectivity between the FCM's 104, the CMM's 108, and the control system 102.

Figure 2:
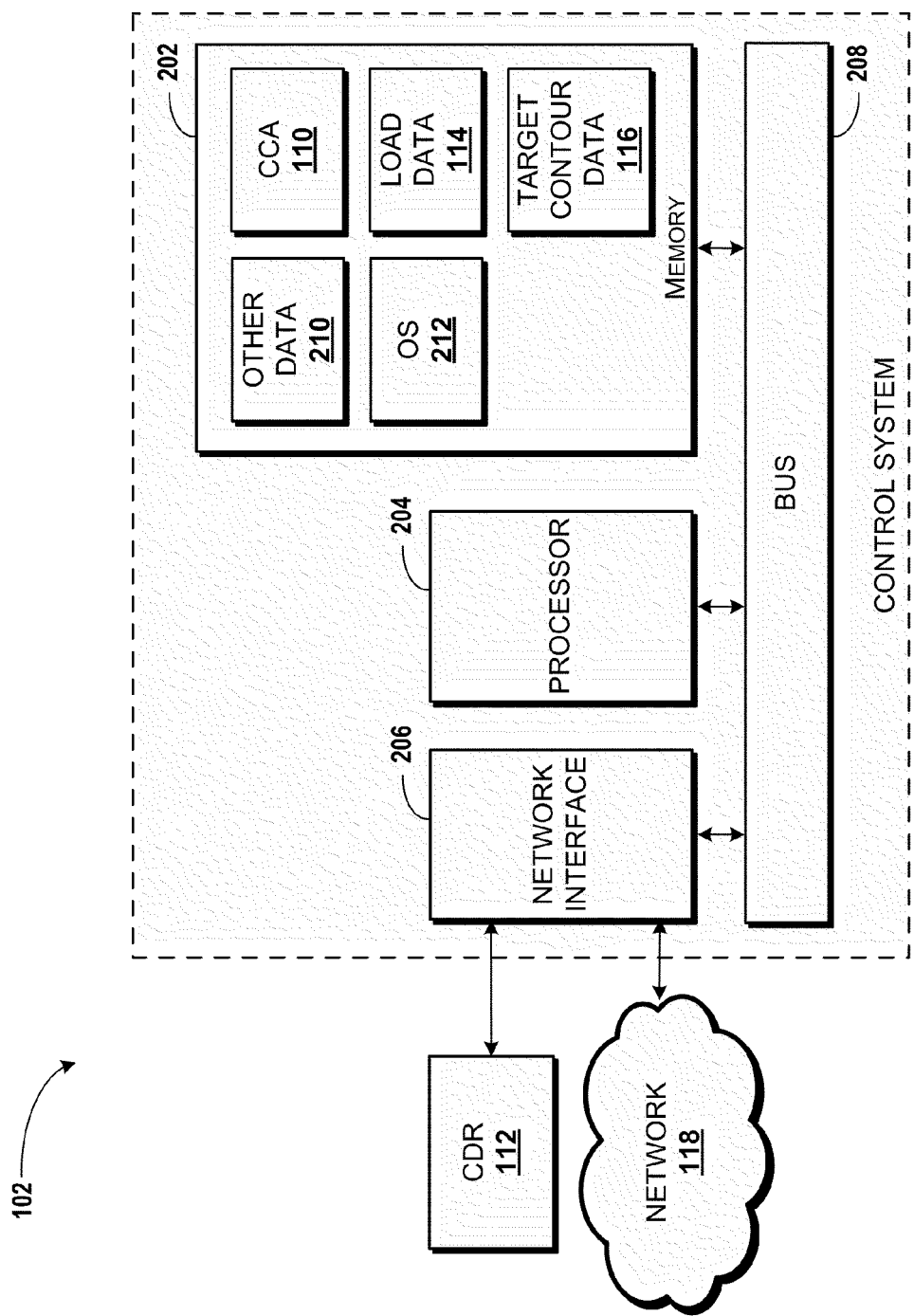
FIG. 2 is block diagram showing elements of a control system, according to an exemplary embodiment of the present disclosure.

Turning now to FIG. 2, the control system 102 will be described, according to an exemplary embodiment of the present disclosure. The illustrated control system 102 includes a data storage device 202 ("memory"), a data processing unit 204 ("processor"), and a network interface 206, each of which is operatively connected to a system bus 208 that enables bi-directional communication between the memory 202, the processor 204, and the network interface 206. Although the memory 202, the processor 204, and the network interface 206 are illustrated as unitary devices, some embodiments of the control system 102 include multiple processors, multiple memory devices, and/or multiple network interfaces.

The processor 204 may include a standard central processor that performs arithmetic and logical operations, a more specific purpose programmable logic controller ("PLC"), a programmable gate array, or other type of processor known to those skilled in the art and suitable for controlling the operation of the control system 102. Data processing devices such as the processor 204 are well-known in the art, and therefore are not described in further detail herein.

Although the memory 202 is illustrated as communicating with the processor 204 via the system bus 208, in some embodiments, the memory 202 is operatively connected to a memory controller (not shown) that enables communication with the processor 204 via the system bus 208. Furthermore, although the memory 202 is illustrated as residing at the control system 102, it should be understood that the memory 202 may include a remote data storage device accessed by the control system 102, for example the CDR 112. Therefore, it should be understood that the illustrated memory 202 can include one or more databases or other data storage devices communicatively linked with the control system 102.

The network interface 206 enables the control system 102 to communicate with other networks or remote systems, for example, the FCMS's 104, the CMM's 108, one or more elements of the network 118, the CDR 112, databases, other devices, combinations thereof, and the like. Examples of the network interface 206 include, but are not limited to, a modem, a radio frequency ("RF") or infrared ("IR") transceiver, a telephonic interface, a bridge, a router, and a network card. Thus, the control system 102 is able to communicate with the network 118 and/or various components of the network 118. As explained above, the network 118 includes, in some embodiments, a WLAN, a WWAN, a WPAN, a WMAN, a WAN, a LAN, a PAN, a MAN, and/or combinations thereof. The control system 102 also may access a public switched telephone network ("PSTN").

The memory 202 is configured for storing computer executable instructions that are executable by the processor 204 to make the control system 102 operative to provide the functions described herein. While embodiments will be described in the general context of program modules that execute in conjunction with application programs that run on an operating system on the control system 102, those skilled in the art will recognize that the embodiments also may be implemented in combination with other program modules. For purposes of clarifying the disclosure, the instructions are described as a number of program modules. It must be understood that the division of computer executable instructions into the illustrated and described program modules may be conceptual only, and is done solely for the sake of conveniently illustrating and describing the control system 102 and the functions performed thereby. In some embodiments, the memory 202 stores all of the computer executable instructions as a single program module. In some embodiments, the memory 202 stores part of the computer executable instructions, and another system and/or data storage device stores other computer executable instructions. As such, it should be understood that the control system 102 may be embodied in a unitary device, or may function as a distributed computing system wherein more than one hardware and/or software modules provide the various functions described herein.

For purposes of this description, "program modules" include applications, routines, programs, components, software, software modules, data structures, and/or other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices. The program modules described herein may be stored at a data storage device such as the memory 202.

The memory 202 may include any type of computer-readable media including volatile and non-volatile, removable and non-removable media implemented in any method or technology for storage of information such as computer-readable instructions, data structures, program modules, or other data. Computer-readable media further includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store the desired information and which can be accessed by the contour control system 100 and/or the contour control application 110.

In some embodiments, the memory 202 stores the contour control application 110. The contour control application 110 is executable by the processor 204 to retrieve and/or receive data associated with the CMM's 108, for example structure surface contour measurements ("actual contour data") or other data. Additionally, the contour control application 110 is executable by the processor 204 to retrieve and/or receive data associated with the FCM's 104, for example, loads sensed at the FCM's 104 and/or forces applied by the FCM's 104. As explained above, the contour control application 110 is executable by the processor 204 to retrieve, receive, and/or analyze the data associated with the FCM's 104 and/or the CMM's 108, the load data 114, the target contour data 116, other data, combinations thereof, and the like. The load data 114 may be stored at the CDR 112, the memory 202, and/or another data storage device and associated with a particular structure 106.

In some embodiments, the load data 114 includes data indicating forces measured at the FCM's 104 of the contour control system 100. In some embodiments, a first manufacturing facility determines the load data 114 associated with the structure, stores the load data 114 at a data storage location such as the CDR 112, associates the load data 114 with the structure 106, and then transports the structure 106 to a second manufacturing facility. The second manufacturing facility retrieves the load data 114 from the data storage location and uses the load data 114 to control the contours of the structure 106. For example, a contour control system 100 of the second manufacturing facility may apply the load data 114 to the structure 106, i.e., the contour control system can configure the FCM's 104 of the system to reproduce the stored load data 114, thereby avoiding determining how to configure the FCM's 104 to provide the desired contours of the structure 106. These and other exemplary embodiments are described in more detail herein.

In some embodiments, the memory 202 includes one or more storage locations for the load data 114 and/or the target contour data 116. As mentioned above, the load data 114 and/or the target contour data 116 may be stored at an alternative data storage device such as, for example, the CDR 112. Thus, the memory 202 may store some, all, or none of the load data 114 and/or the target contour data 116. The memory 202 also stores other data 210. The other data 210 includes data and instructions. For example, the other data 210 can include operating statistics, authentication data, user information, manufacturing statistics, quality control data and applications, data caches, data buffers, user interface applications, additional programs, applications, program modules, data, combinations thereof and the like.

In some embodiments, the memory 202 includes an operating system 212. Examples of operating systems include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Although not illustrated, the control system 102 also may include a random access memory ("RAM") and a read-only memory ("ROM"). The ROM can store, for example, a basic input/output system ("BIOS") containing the basic routines that help to transfer information between elements within the control system 102, such as during startup. In some embodiments, the control system 102 further includes a mass storage device for storing additional and/or alternative application programs and program modules. The mass storage device can be connected to the processor 204 through a mass storage controller (not shown) connected to the bus 208. The mass storage device and its associated computer-readable media provide non-volatile storage for the control system 102. It should be appreciated by those skilled in the art that computer-readable media can be any available media that can be accessed by the control system 102, including the various types of computer-readable media set forth above. The control system 102 also may include an input/output controller (not illustrated) for receiving and processing input from one or more input devices such as, for example, a keyboard, mouse, electronic stylus, and the like (not shown). Similarly, an input/output controller may provide output to a display screen, a printer, or other type of output device (not shown).

Figure 3A:
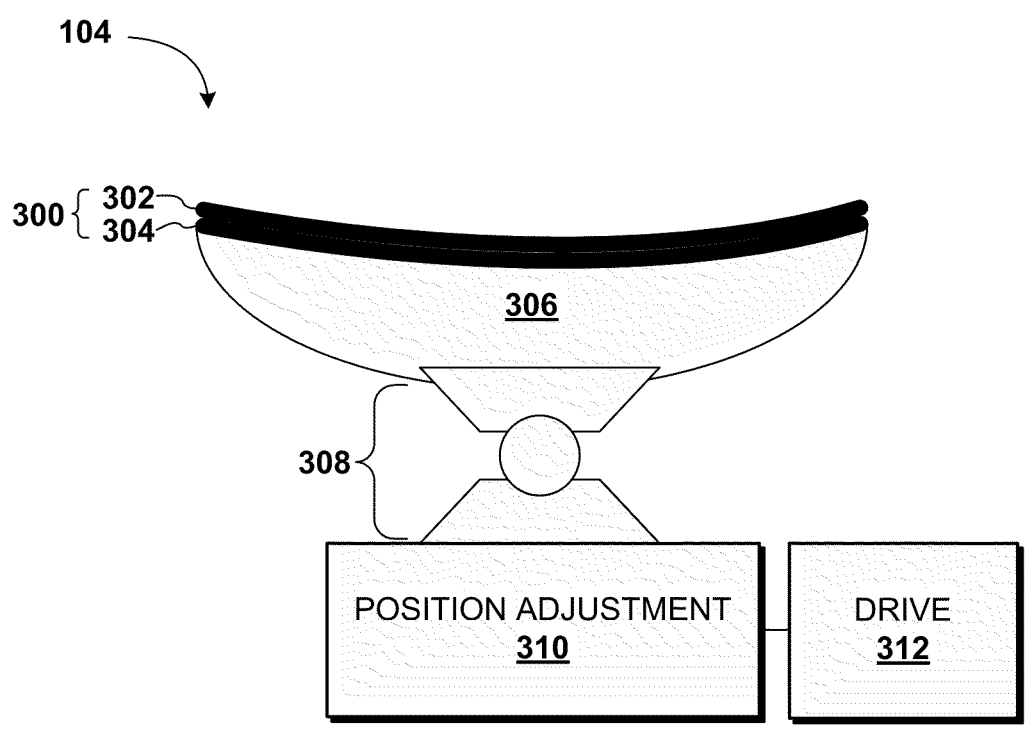
FIG. 3A schematically illustrates a force control module ("FCM"), according to an exemplary embodiment of the present disclosure.

Turning now to FIG. 3A, an FCM 104 will be described, according to an exemplary embodiment of the present disclosure. The FCM 104 is configured to provide a moveable support to control the contours of the structure 106. Additionally, the FCM 104 is configured to apply forces to the structure 106 to maintain or adjust the contours of the structure 106. In some embodiments of the contour control system 100, a number of FCM's 104 are positioned at supporting locations around the structure 106. The precise number and positions of the supporting locations may be determined using any known engineering techniques such as finite element analysis. For example, if the structure 106 is a rigid structure that has a relatively uniform mass distribution and relatively little weight, then relatively fewer FCM's 104 may be used than would be used if the structure 106 is a heavy flexible structure with uneven mass distribution. In the first scenario, the FCM's 104 may be evenly spaced around or under the structure 106, while in the latter scenario, the FCM's 104 may be grouped more closely under the heavier portions of the structure 106 to limit the deflection of the structure 106 between the FCM's 104. Similarly, if the structure 106 is a rigid structure, FCM's 104 may be employed to apply forces to the top or sides of the structure to assist in form-fitting the structure 106 to a cradle or other manufacturing assembly device that also relies upon gravity to maintain the structure 106 in a desired position for manufacturing and/or assembly. One example of this implementation will be shown and discussed below with reference to FIG. 4A. In some embodiments, the FCM's 104 include "smart jacks" and/or other devices disclosed in co-pending U.S. patent application Ser. No. 11/944,872, entitled "Controlled Application of External Forces to a Structure for Precision Leveling and Securing," which is hereby incorporated by reference in its entirety.

The illustrated FCM 104 includes a load surface 300. The load surface 300 is configured to contact a surface of the structure 106 to bear a force and/or selectively apply a force to the structure 106. In some embodiments, the load surface 300 includes a structure contact surface layer 302 disposed above a load sub-surface layer 304, though this is not necessarily the case. Furthermore, the load surface 300 includes, in some embodiments, additional and/or alternative layers. In some embodiments, one or more layers 302, 304 of the load surface 300 include an air cushion contact pad configured to be selectively activated to apply a force to a surface of the structure 106. In some embodiments, one or more layers 302, 304 of the load surface 300 includes a rubber contact pad configured to contact a surface of the structure 106. The load surface 300 is configured to support the structure and/or to apply a static or dynamic force to a surface of the structure 106. Other configurations of the load surface 300 are possible, and are contemplated. For example, one or more layers 302, 304 of the load surface 300 may include a vacuum cup for applying a force to a surface of the structure 106. The vacuum cup embodiment of the FCM 104 is configured to pull a surface of the structure to support the structure 106 and/or to deform the structure 106 to control one or more structure contours, as discussed above.

In some embodiments, the FCM 104 includes a support structure 306, which can include a composite, aluminum, or other material that functions as a support sub-structure for the load surface 300. The support structure 306, if included, can perform several functions. For example, the support structure 306 can provide rigidity for the load surface 300, particularly if the load surface 300 is soft and/or pliable, as is often the case with a rubber pad, an air cushion layer, and/or a vacuum cup layer. Additionally, the support structure 306 can be configured to bear forces transferred between the FCM 104 and the surface of the structure 106 to reduce strain on the load surface 300 and/or the layers 302, 304 thereof. In some embodiments, the FCM 104 includes a centering mechanism 308. The centering mechanism 308 may include, but is not limited to, a split gimbal self-centering support bearing, a ball and socket joint, or other centering mechanisms.

The FCM 104 also can include a position adjusting mechanism 310 for adjusting the position of the load surface 300 with respect to the surface of the structure 106. The position adjusting mechanism 310 includes, in some embodiments, a height adjustment mechanism for adjusting the height of the FCM 104 and/or components thereof. The height adjustment mechanism can include a servomotor, a hydraulic actuator, a pneumatic actuator, pneumatically driven pistons or other devices, threaded sleeves and reciprocally threaded shafts, adjustable parallel tooling, adjustable jacks, other height adjustment mechanisms, and the like. Considering, for a moment, the height of the FCM 104 as being along a 'z-axis,' the position adjusting mechanism 310 also includes, in some embodiments, mechanisms for adjusting the position of the load surface 300 in the 'x-axis' and the 'y-axis.' The FCM 104 therefore may include various devices for adjusting the position of the load surface 300 with respect to a surface of the structure 106. The position adjusting mechanism 310 may be driven by a drive 312, which may include motors, air lines, vacuum lines, switches, pressure controllers, jacks, gears, electronic controls, combinations thereof, and the like.

Figure 3B:
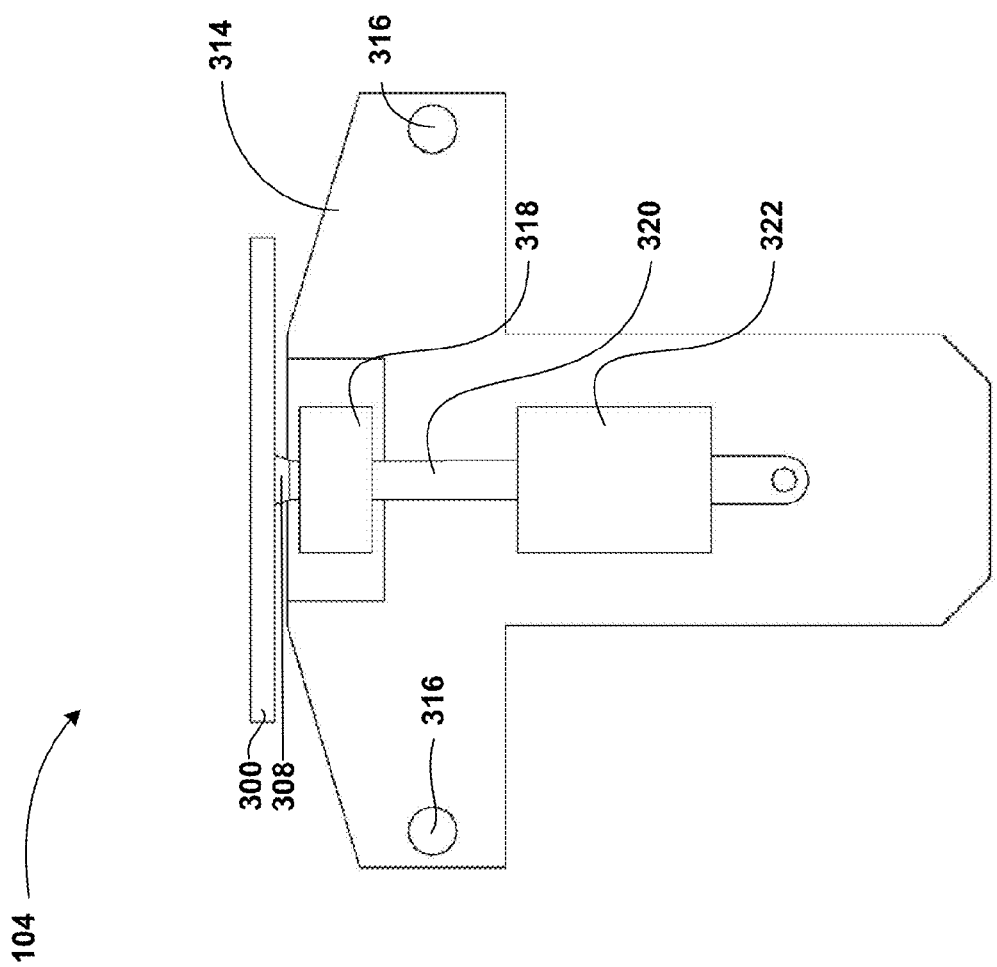
FIG. 3B illustrates an FCM, according to another exemplary embodiment of the present disclosure.

FIG. 3B illustrates an FCM 104, according to another exemplary embodiment of the present disclosure. The FCM 104 includes a lower support plate 314. In some embodiments, the lower support plate 314 mates with an upper support plate (not illustrated in FIG. 3B), though this is not necessarily the case. The lower support plate 314 includes connection mechanisms 316 for connecting the FCM 104 to a desired structure, for example, a support cradle, as will be shown and discussed below with reference to FIGS. 4B-4D. The connection mechanisms 316 are illustrated as apertures for receiving a rod, screw, bolt, rivet, and/or another connector, though this embodiment is exemplary and should not be construed as being limiting in any way. The lower support plate 314 includes a linear bearing 318 through which a connection rod 320 passes. The linear bearing can be any known linear bearing including, but not limited to, a closed linear pillow block bearing. The connection rod 320 is connected to the load surface 300 or a component thereof via the centering mechanism 308 on one end, and to a force sensor 322, for example, a force sensing actuator, on the other end.

The force sensor 322 may be a load cell, a pressure gauge, a piezoelectric sensor, or any other type of force sensor capable of measuring the quantity of force applied to the structure 106 by the FCM 104 and/or to the FCM 104 by the structure 106. Suitable examples of the force sensor 322 include, but are not limited to, force measuring actuators sold by Exlar Corporation of Chanhassen, Minn. under the mark EXLAR®, including model numbers GSX30, GSX40, GSX50, GSX60, IS30 and IS40. The force sensor 322 may be located as shown, or may be located in any other suitable position for sensing and/or measuring the force between the FCM 104 and the structure 106. In embodiments in which the force sensor 322 include a force measuring capability, the force sensor 322 can be used to provide the FCM 104 with the ability to measure a force measured between the FCM 104 and a structure in contact with the FCM 104, for example, the structure 106. The forces sensed by the FCM 104 can be reported to the contour control system 100 to be used to determine the contours of the structure 106. Thus, the contour control system 100 is configured to use the CMM's 108 and/or the FCM's 104 to determine the contours of the structure 106.

The FCM 104 can be activated via the control system 102 or another device. Thus, the use of a force sensing actuator 322 is merely exemplary and should not be construed as being limiting in any way. Additional and alternative embodiments are described herein. Although not illustrated in FIG. 3B, the FCM 104 may be coupled to a position adjusting mechanism 310 and/or a drive 312, as discussed with reference to FIG. 3A. The position adjusting mechanism 310 and/or the drive 312 are operative to adjust the position of the FCM 104 with respect to the structure 106, and may be controlled by the control system 102 and/or the contour control application 110 as explained herein. Communications between the contour control application 110 and the FCM 104 may be conducted over one or more wired and/or wireless networks or network components, or may be via a direct wired and/or wireless link. Regardless of the type of connection used, the contour control application 110 is operative to send control commands to the FCM 104 or a component thereof, for example, the position adjusting mechanism 310 and/or the drive 312, to control the position of and/or a force applied by the FCM 104 to the structure 106. Furthermore, the contour control application 110 is operative to receive data indicating the force applied to or by the FCM 104, and to use that data to determine whether the position of and/or the force applied by the FCM 104 should be adjusted to control a contour of the structure 106. Thus, the contour control application 110 is able to control the amount of force applied to the structure 106 by the FCM 104 and/or the location of the force applied to the structure 106 by the FCM 104 to control one or more contours of the structure 106.

Figure 3C:
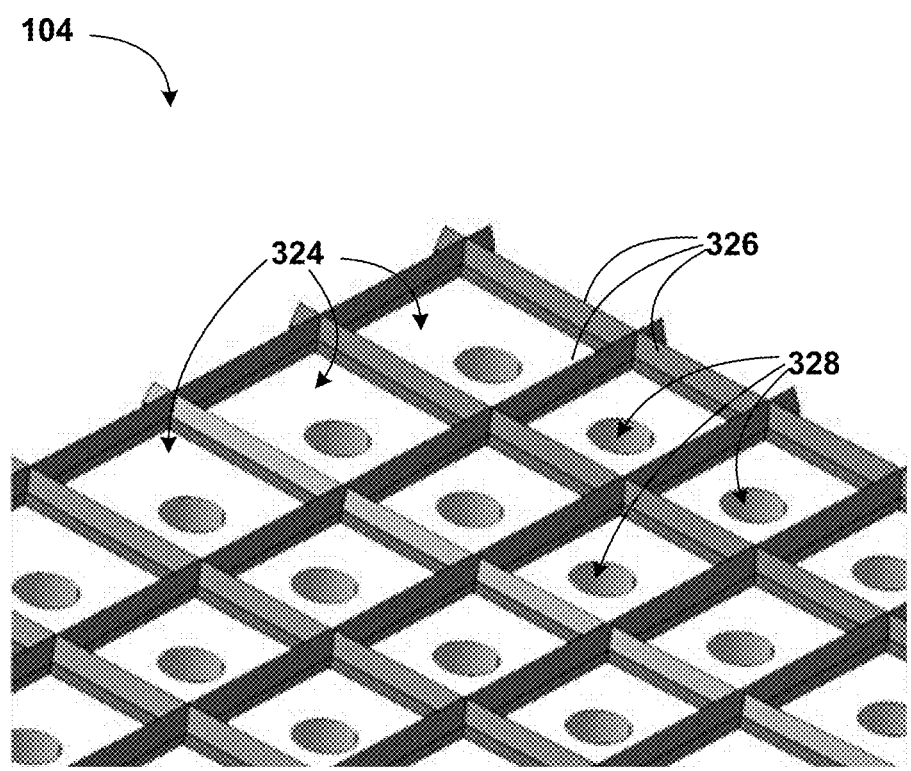
FIG. 3C illustrates a portion of a surface of a multi-cell FCM, according to an exemplary embodiment of the present disclosure.

FIG. 3C illustrates a portion of a surface of an FCM 104, according to another exemplary embodiment of the present disclosure. The FCM 104 illustrated in FIG. 3C employs an array of air pressure application cells 324. Each of the air pressure application cells 324 can include contact surfaces 326 that contact the surface of the structure 106. The contact surfaces 326 can include pliable or malleable ridges so that the contact surfaces 326, and therefore the FCM 104, mold to the surface of the structure 106. Thus, each air pressure application cell 324 can be sealed against the structure so that air pressure can be controlled at the surface 106 corresponding to each of the air pressure application cells 324. In one contemplated embodiment, the contact surfaces 326 include compressible blue rubber baffles that include 0.200 inches in compressible height. It should be understood that this embodiment is exemplary, and that other materials and compressible heights are both possible and contemplated.

As illustrated, each of the air pressure application cells 324 further can include a pressurized air intake port 328 and a pressure sensor (not visible). The pressure sensors measure pressure at each air pressure application cell 324. The measured pressure can be transmitted or fed back to the control system 102, which can analyze the measured pressure as force or load data 114. The control system 102 can be configured to control the flow of air to each of the air pressure application cells 324 to regulate, change, activate, and/or deactivate air pressure at each individual air pressure application cell 324. Although not illustrated in FIG. 3C, the air pressure application cells 324 also can include a position adjustment device and a drive, which can function in a manner similar to the position adjustment device 310 and the drive 312 illustrated and described with reference to FIG. 3A. In one embodiment, each air pressure application cell 324 includes a ball screw drive, mounted under each air pressure application cell 324, for adjusting the position of the air pressure application cell 324. An FCM 104 constructed in accordance with FIG. 3C can be used to evenly distribute support forces over a large surface of the structure 106, and to help avoid destructive single point loads that may be applied to the structure 106 if using other support structures.

FIG. 4A illustrates a structure support cradle 400 ("cradle"), according to an exemplary embodiment of the present disclosure. The cradle 400 includes a contact surface 402 that contacts a surface of the structure 106. In some embodiments, the cradle 400 includes one or more cradle modules 404 that collectively join together to provide the support surface 402 and the other structures described herein. It some embodiments, the cradle 400 includes a substantially unitary structure. Thus, it should be understood that the cradle 400 need not include the cradle modules 404, and that the illustrated embodiment is merely exemplary and should not be construed as being limiting in any way.

In some embodiments, the cradle modules 404 include ribs 406 and apertures 408. Ribs 406 may be included to provide or increase rigidity and support for the support surface 402, but are not always necessary and therefore may be omitted in some embodiments. As illustrated, the cradle 400 can include one or more FCM's 104. In some embodiments, the FCM's 104 are disposed such that the load surfaces 300 of respective FCM's 104 are flush with the contact surface 402, below the contact surface 402, or above the contact surface 402. The illustrated configuration, i.e., the load surfaces 300 of respective FCM's 104 being disposed above the contact surface 402, is provided for purposes of clarifying the concepts of the present disclosure and should not be construed as being limiting in any way. In some embodiments, the contact surface 402 supports a surface of the structure 106 and the FCM's 104 are used to measure forces at the locations of the FCM's 104 and/or to apply additional support or forces to the surface of the structure 106 to control contours of the structure 106.

Turning now to FIG. 4B, additional details of the cradle 400 and the FCM's 104 are explained. FIG. 4B illustrates placement of an FCM 104 according to an exemplary embodiment of the present disclosure. In the illustrated embodiment, the FCM 104 includes the lower support plate 314 as described above with reference to FIG. 3B. The FCM 104 also includes the upper support plate 410 mentioned above, which is configured to be connected to the lower support plate 314 using connectors 412, 414. The illustrated connectors 412, 414, as well as the numbers of connectors and the placement thereof, are merely exemplary and should not be construed as being limiting in any way. The FCM 104 is configured to be connected to a cradle module 404 via the connectors 412, 414 and an FCM attachment plate 416. The FCM attachment plate 416 includes a throughhole 418 through which the connector 412 passes, though this method of attaching the FCM attachment plate 416 to the FCM 104 is merely exemplary. As illustrated, the FCM 104 can be connected between two cradle modules 404 using the connectors 412, 414 and the FCM attachment plates 416.

Figure 4D:
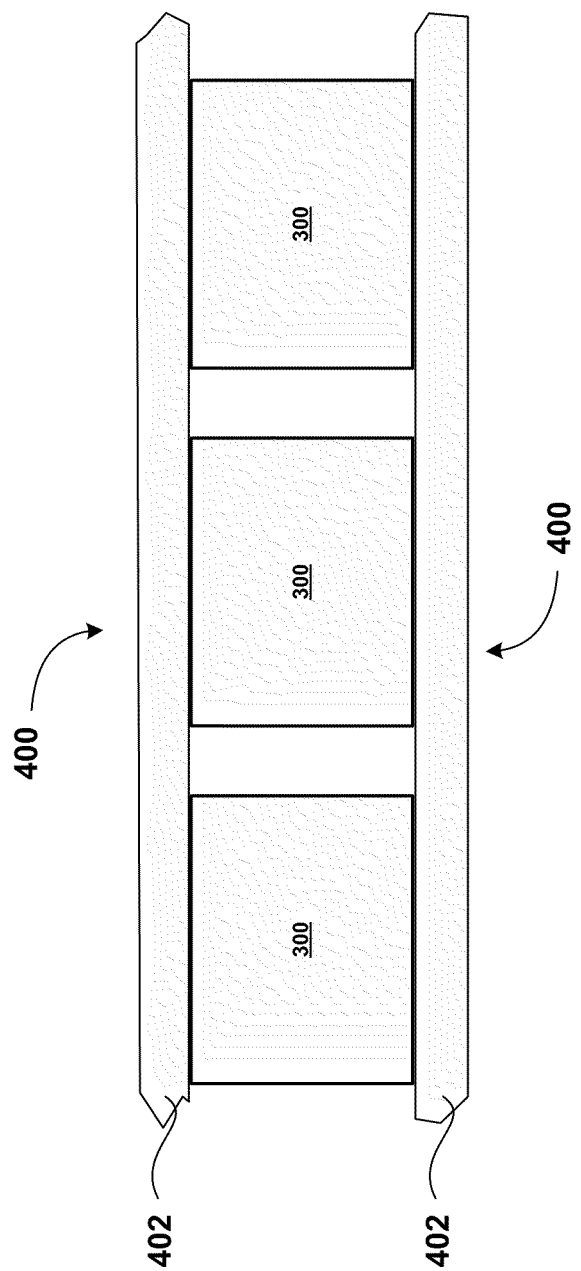

Additional views of the FCM 104 and the cradle modules 404 are provided in FIGS. 4C-4D. FIG. 4C illustrates a perspective view of the FCM 104 and cradle modules 404 of FIG. 4B. FIG. 4D illustrates a top view of three FCM's 104 attached between two cradles 400. In FIG. 4D, the support surfaces 402 of the cradles 400 are visible, as are the load surfaces 300 of the FCM's 104. It should be understood that the load surfaces 300 may have alternative shapes and configurations, and that the illustrated embodiment is merely exemplary. In FIG. 4D, only the load surfaces 300 of the FCM's 104 are visible, though this is not necessarily the case.

Figure 5A:
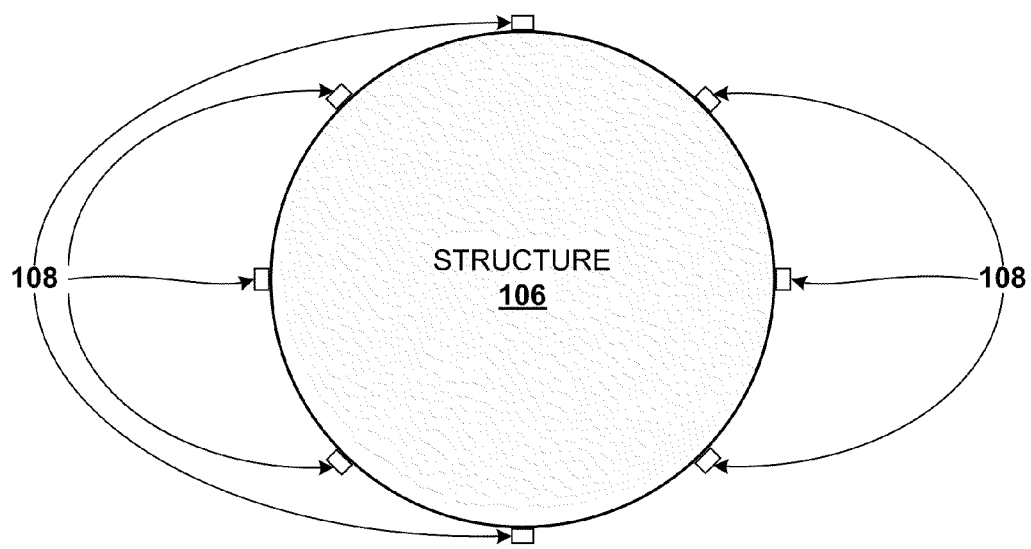
FIG. 5A illustrates placement of contour measurement modules, according to an exemplary embodiment of the present disclosure.

Turning now to FIG. 5A, placement of the CMM's 108 with respect to the structure 106 is illustrated, according to an exemplary embodiment of the present disclosure. Although not illustrated in FIG. 5A, it should be understood that the structure 106 can be supported by support structures such as, for example, the cradle 400. In the illustrated embodiment, a radial array of CMM's 108 is disposed at the surface of the structure 106. In the illustrated embodiment, eight CMM's 108 are included, though other numbers of CMM's 108 are possible and are contemplated. While the CMM's 108 are illustrated as being adjacent the surface of the structure 106, it should be understood, as explained above, that in some embodiments, the CMM's 108 include one or more laser radar or laser tracker devices placed proximate to an inner or outer surface of the structure 106. The effective range of some laser radar and/or laser tracker devices can be between one and sixty meters, or even greater. Therefore, the CMM's 108 may be placed a substantial distance away from the structure 106.

Thus, the number of the CMM's 108, as well as the respective locations and placement of the CMM's 108, can be determined based upon the needs associated with the structure 106 and/or the limitations and/or needs of a particular application of the contour control system 100 and/or the type of device used to provide the functions of the CMM 108. For example, for low tolerance applications, i.e., for applications where high accuracy and precision are required, more CMM's 108 may be used than are used for relatively high tolerance applications wherein a relatively lower level of accuracy and precision are required. Again, the exact number of CMM's 108 and the placement thereof will vary depending upon the application. With an understanding of the concepts of the present disclosure, one of ordinary skill in the art will be able to determine the number of CMM's 108 to be employed and the respective placement thereof, without undue experimentation.

As mentioned above, the CMM's 108 can determine the locations and/or configurations of one or more surfaces of the structure 106, one or more surface contours of the structure 106, and/or one or more points of the structure 106. The CMM's 108 can output these determined locations and/or configurations as data that is interpretable by the contour control system 100 as indicating the locations and/or configurations of the contours of the structure 106. The contour control system 100 may compare the determined locations and/or configurations of the contours of the structure 106 to the desired structure contours and can determine forces that should be applied to the structure 106 to manipulate the structure 106 to generate the desired structure contours.

Figure 5B:
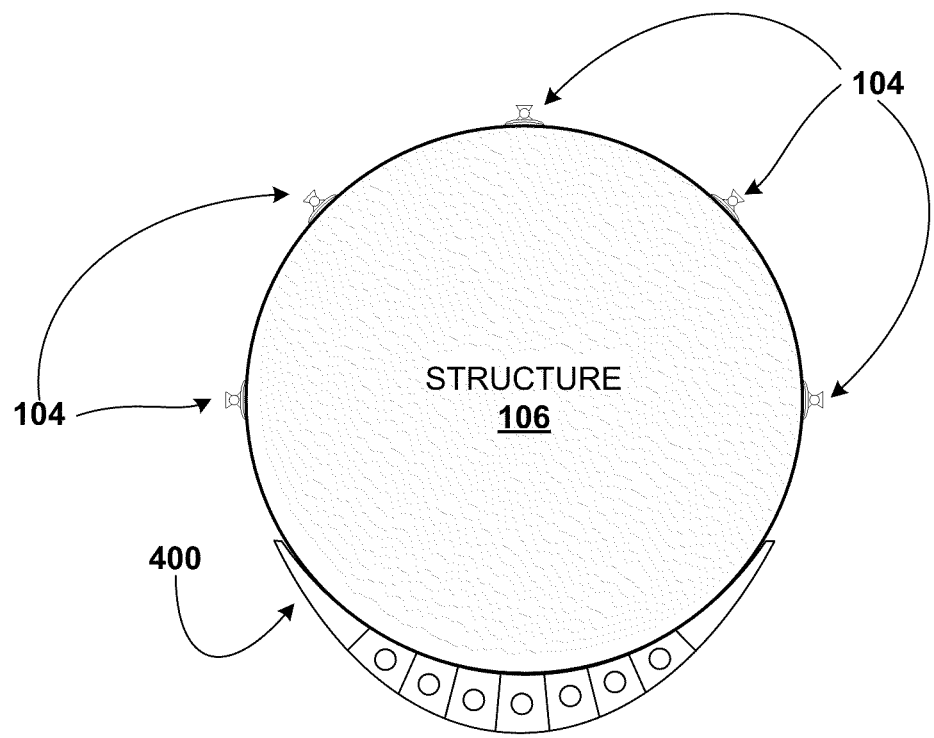
FIG. 5B illustrates placement of FCM's and the structure support cradle, according to an exemplary embodiment of the present disclosure.

Turning now to FIG. 5B, placement of the FCM's 104 and the cradle 400 with respect to the structure 106 is illustrated, according to an exemplary embodiment of the present disclosure. As illustrated, the structure 106 is supported by the cradle 400. Although not visible in FIG. 5B, the cradle 400 includes a number of FCM's 104, for example the FCM's 104 illustrated in FIGS. 3A-4D. Additionally, a number of FCM's 104 are disposed at several locations around the surface of the structure 106. In the illustrated embodiment, the FCM's 104 include vacuum cups and the cradle 400 includes seven FCM's 104 that include air cushion contact pads. Additional and/or alternative FCM's 104 are possible and are contemplated.

As mentioned above, the contour control application 110 is operative to compare the actual contour data associated with the structure 106, for example data obtained by the FCM's 104 and/or the CMM's 108, to design data such as the target contour data 116 to determine if the contours of the structure 106 are consistent with the intended design and any allowed tolerances. The contour control application 110 also is operative to receive force/load data measured by the FCM's 104. The force/load data can be stored in the memory 202, the CDR 112, or at another data storage device as, for example, the load data 114. This load data 114 may be stored when the contours of the structure 106 are in a desired configuration, such that another contour control system 100 can replicate the desired contour configurations without having to reanalyze and measure the surface contours. As explained, this embodiment may be particularly useful when the structure 106 is manufactured, stored, and/or assembled at more than one facility. The contour control application 110 also is operative to analyze the actual contour data obtained by the CMM's 108 and/or the force/load data measured at the FCM's 104 to determine if the structure 106 is consistent with a desired design and any associated tolerances.

The analysis of the target contour data 116, the load data 114, and/or the actual contour data provided by the CMM's 108 and/or the FCM's 104 can be used by the contour control application 110 to determine if any forces should be applied to the surfaces of the structure 106 to manipulate the structure 106 to correct deviations between the target contour data 116 and the actual contour data associated with the structure 106. In one embodiment, the contour control application 110 relies only upon the load data 114 associated with the FCM's 104 to determine if any forces should be applied to or removed from the structure 106. For example, each FCM 104 can have a calculated target force value and associated tolerances, wherein the target force values may be calculated for FCM 104 at each FCM 104 location. The target force values are forces that, if applied at the locations associated with respective FCM's 104, should result in the desired structure contours of the structure 106. Thus, the contour control application 110 monitors the forces applied and/or sensed at each FCM 104 to determine if the forces deviate from the corresponding threshold range of force values. Once the contour control application 110 determines that a particular force measurement is out of tolerance, or out of a pre-determined threshold range of force values, then the contour control application 110 is operative to activate the associated FCM 104 to apply or remove force between the FCM 104 and the structure 106 until the force measurement is again within tolerance, or within the pre-determined threshold range of force values.

It should be understood that the target force values and corresponding threshold ranges of acceptable force values can be established using known engineering analysis tools and techniques such as finite element analysis when the locations for each FCM 104 and the quantity of the FCM's 104 are determined It should be appreciated that the quantity of FCM's 104, the locations of each of the FCM's 104, the target forces applied by each of the FCM's 104, and the threshold range of acceptable force values for each FCM 104 may be calculated by the contour control application 110 after receiving input regarding the characteristics of the structure 106, for example the target contour data 116 and/or the actual contour data obtained by the CMM's 108 and/or the FCM's 104, or may be input into the contour control application 110 by an authorized entity.

Figure 6:
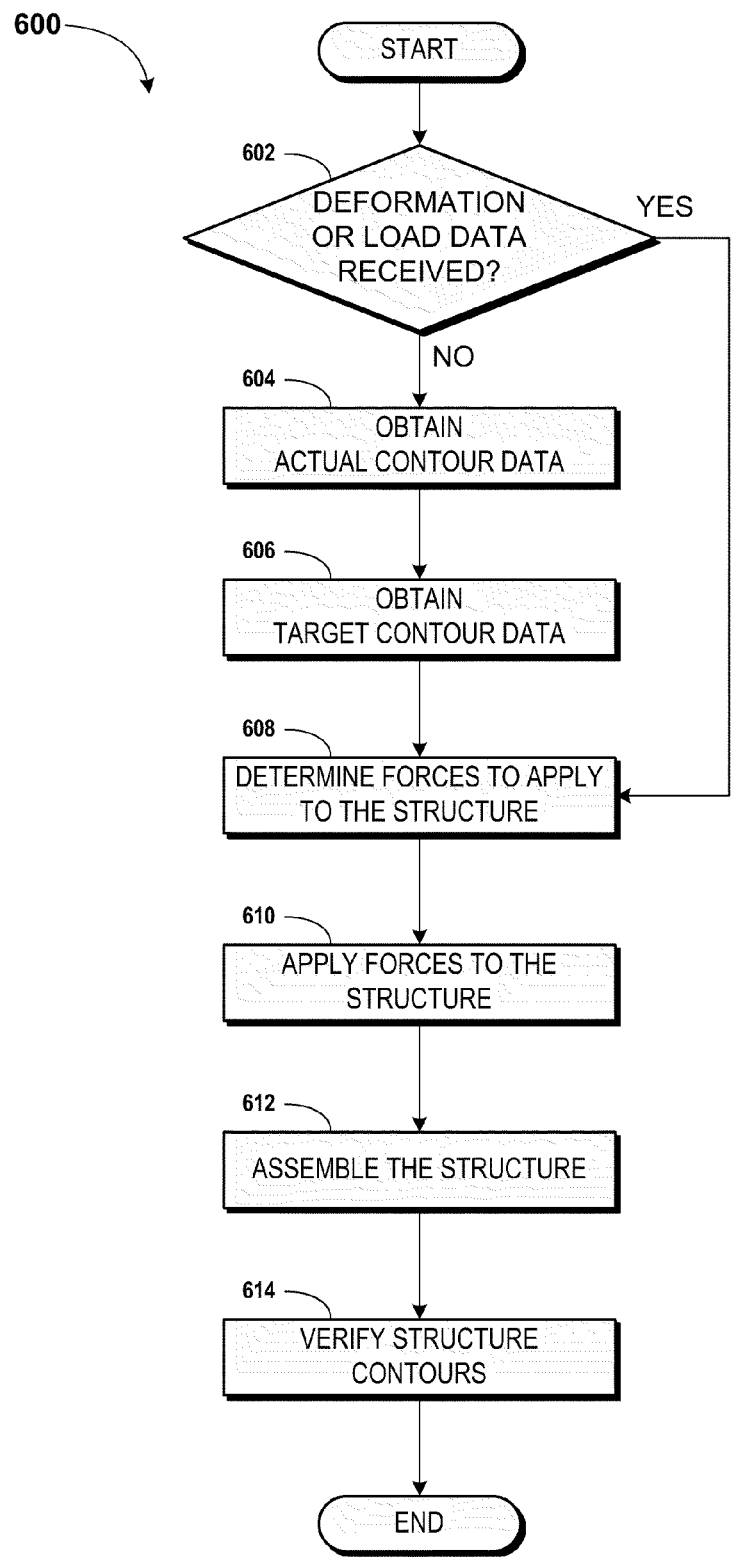
FIG. 6 schematically illustrates a method for using the contour control system, according to an exemplary embodiment of the present disclosure.

Turning now to FIG. 6, a method 600 for controlling structure contours using the contour control system 100 will now be described in detail. It should be understood that the operations of the method 600 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated method 600 can be ended at any time and need not be performed in its entirety.

Some or all operations of the method 600, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. For purposes of illustrating and describing the concepts of the present disclosure, the method 600 is described as being performed by the contour control system 100, though this embodiment is merely exemplary.

The method 600 begins at operation 602, wherein the contour control system 100 determines if deformation data associated with the structure 106 has been received. The deformation data indicates how the structure 106 deviates from a desired structure design and can be used by the contour control system 100 to determine how to manipulate the structure 106 to obtain the desired contours. Additionally, or alternatively, the deformation data can include the load data 114, which can indicate the loads needed at the FCM's 104 to manipulate the structure 106 to obtain the desired contours. As mentioned above, the load data 114 can be received from a manufacturing, assembly, or storage facility, or from an entity transporting the structure 106. In some embodiments, the load data 114 is generated and/or retrieved from the FCM's 104 of the contour control system 100. Thus, it should be understood that some embodiments of the method 600 are performed by one contour control system 100 and some embodiments of the method 600 are performed by two or more contour control systems 100.

If the deformation data and/or the load data 114, have not been received, the method 600 proceeds to operation 604, wherein the contour control system 100 determines the actual contour data associated with the structure 106 ("actual contour data"), i.e., data indicating the location and configuration of the contours of the structure 106, so the contour control system 100 can determine if the structure contours deviate from contours associated with a desired structure design. Thus, as explained above, the contour control system 100 is operative to measure the structure 106, e.g., to receive and/or retrieve data from the CMM's 108 and/or the FCM's 104 to determine the actual contours of the structure 106. As explained above, the contour control system 100 can obtain the actual contour data from a number of contact and/or contactless measuring devices including, for example, the FCM's 104 and/or the CMM's 108.

The method proceeds to operation 606, wherein the contour control system 100 obtains target contour data 116 associated with the structure 106. As explained in detail above, the contour control system 100 is configured to retrieve target contour data 116 indicating the specified contour locations, configurations, and/or associated tolerances. In some embodiments, the target contour data 116 is stored at a data storage device such as, for example, hard drive, a memory, a database, a server, or the like, for example the CDR 112. Thus, the operation 606 includes, in some instances, communicating with the CDR 112 to determine if target contour data 116 associated with the structure 106 is available, and retrieving the target contour data 116, if available.

As illustrated, the method 600 proceeds to operation 608 after operation 606, or after operation 602 if the contour control system 100 determines at operation 602 that the deformation data is available. As explained above, the contour control system 100 is configured to retrieve target contour data 116 indicating the specified contour locations, configurations, and/or associated tolerances. At operation 608, the target contour data 116 is analyzed by the contour control system 100 to determine forces to apply to the structure 106. For example, the contour control system 100, or a contour control application 110 of the contour control system 100, is operative to compare the retrieved or received shape data to the target contour data 116 indicating desired design contours for the structure 106 and can determine how to manipulate the structure 106 to obtain the desired contours. In some embodiments, the contour control system 100 is configured to analyze actual contour data that is measured by the FCM's 104, without relying upon measurements collected by the CMM's 108, to determine if the actual contours of the structure 106 deviate from the contours of the targeted design of the structure 106.

Therefore, it should be understood that the contour control system 100 is operative to analyze actual contour data retrieved from various sensors and measurement devices, including the FCM's 104 and/or the CMM's 108, to determine if the contours of the structure are consistent with a desired design and any associated tolerances. Regardless of which measurement devices the contour control system 100 uses to obtain the actual contour data, the contour control system 100 is configured to retrieve the target contour data 116 from the memory 202 and/or the CDR 112 and comparing the target contour data 116 to the actual contour data.

Additionally, or alternatively, operation 608 includes, in some embodiments, retrieving load data 114 from the memory 202 and/or the CDR 112, and comparing the load data 114 to the actual contour data in the form of measured force/load data retrieved from the FCM's 104. By analyzing the various data available to the contour control system 100, the contour control system 100 determines not only if the structure contours are within tolerance of the desired structure contours, but also the extent to which the structure contours deviate from the desired structure contours. Thus, the contour control system 100 determines how to manipulate the structure 106 to control the contours of the structure 106 such that the contours of the structure 106 will be within tolerance of the targeted design contours.

The method 600 proceeds to operation 610, where the contour control system 100 applies the determined forces to the structure 106. In operation 610, the contour control system 100 uses the forces determined in operation 608 to control the FCM's 104. As explained above, the contour control system 100 may inflate one or more air cushion pads of the FCM's 104, deflate one or more air cushion pads of the FCM's 104, increase suction of one or more vacuum cups of the FCM's 104, decrease suction of one or more vacuum cups of the FCM's 104, bring one or more FCM's 104 into or out of contact with the structure, or adjust the position of one or more FCM's 104. Thus, at operation 610, the contour control system 100 applies any forces determined by the contour control system 100 to be needed to adjust the contours of the structure 106. It should be understood that the forces needed to adjust the contours of the structure 106 may be obtained from deformation data passed to the contour control system 100 from another entity and/or determined by the contour control system 100, for example, as determined in operation 608 or in accordance with other operations.

The method 600 proceeds to operation 612, wherein one or more assembly, manufacturing, or other operations are performed on the structure 106. For example, two structures 106 may be mated together while the respective contours of the structures 106 are adjusted to the desired configurations. Because the respective contours of the structures 106 may be controlled, the assembly, manufacturing, and/or other operations may be simplified and additional labor may be avoided. For example, in some applications, the mating of two or more fuselage sections of an aircraft requires that the two fuselage sections be similarly configured. During transit of the fuselage sections, the surface contours of the sections may move, complicating the mating steps. Thus, assembly facilities may include shim production facilities such that gaps between the mated components may be minimized and/or eliminated. To the contrary, manufacturing facilities employing a contour control system 100 such as that disclosed herein may be able to manipulate the respective components such that less manpower and/or materials are needed to complete the assembly operations. These and other operations associated with assembling, machining, manufacturing, and/or transporting the structure 106 may be simplified, and/or the costs and time required to perform these operations may be reduced, using the methods and systems disclosed herein.

In some embodiments, the method proceeds to operation 614, wherein the contour control system 100 verifies the structure contours, i.e., the contour control system 100 can determine if the shape of the structure 106 is consistent with the desired contours and associated tolerances of a desired structure 106. As mentioned above, not all operations are required, and it is possible and contemplated that the verification process of operation 614 may be omitted or skipped based upon a determined process accuracy and/or precision, as well as other factors. Although not illustrated in FIG. 6, the contour control system 100 is configured to store load data 114 at any time. For example, the contour control system 100 can store the load data 114 when the contours of the structure 106 are determined to be consistent with the desired structure contours and the associated tolerances. At such a time, or at any time when prompted by an operator or trigger condition, the loads associated with all FCM's 104 can be stored as load data 114. As explained above, the load data 114 can be stored at the memory 202, the CDR 112, and/or another data storage device. If the structure 106 is transported to another entity, the load data 114 may be transported with the structure 106 and/or stored in a data storage device accessible by the other entity. The method 600 ends.

Although not described in detail above, the contour control system 100 is configured to continuously monitor and control the contours of the structure 106. Thus, the devices and methods described above may be continuously employed to maintain the structure 106 in the targeted configuration during a particular operation, e.g., an assembly, machining, manufacturing, and/or transportation operation. In the example of an aircraft fuselage, it will be appreciated that additional structures and components may be added to the structure 106. For example, flooring, stringers, attachment mechanisms, doors, windows, wiring, wiring harnesses, electronics, plumbing, seating, trim, other structures, combinations thereof, and the like, may be added. These components contribute weight to the structure 106 and adding these structures to the structure 106 may alter the shape or configuration of the structure 106. Thus, the ability to continuously monitor and adjust the FCM's 104 to maintain the structure 106 in the desired configuration may greatly reduce the variations sometimes experienced in aircraft fuselage manufacturing, assembly, and/or other operations. As mentioned above, the load data 114 associated with the FCM's 104 can be stored at any time and can be passed to another entity. Thus, after a manufacturing, assembly, or other operation, the structure 106 may be transported to another entity that can access the load data 114. Therefore, the other entity will have the ability to return the structure to the desired shape with little effort, instead simply importing the load data 114 to the contour control system 100 and applying that load data 114 to the structure 106.

Based on the foregoing, it should be appreciated that systems and methods for controlling the contours of a structure 106 and monitoring and controlling forces applied to the structure 106 to control the contours of the structure 106 are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

We claim:

1. A method for controlling a contour of a structure, the method comprising:
   obtaining actual contour data;
   receiving target contour data;
   comparing the actual contour data and the target contour data;
   responsive to the comparison, determining a force to be applied to the structure by a force control module; and
   activating the force control module to apply the determined force, wherein activating the force control module comprises controlling an air cushion pad associated with the force control module, and wherein the air cushion pad is configured to be selectively inflated to apply a force to the structure and selectively deflated to reduce the force applied to the structure.

2. The method of claim 1, wherein obtaining the actual contour data comprises measuring, with a force sensor associated with the force control module, a force between the force control module and the structure to determine the actual contour data.

3. The method of claim 1, wherein obtaining the actual contour data comprises measuring, with a contour measurement module, at least one of the location of the contour and the configuration of the contour.

4. The method of claim 3, wherein the measuring further comprises:
   providing a laser radar device;
   disposing the laser radar device within operating range of the structure; and
   scanning the structure, with the laser radar device, to determine at least one of the location of the contour and the configuration of the contour.

5. The method of claim 1, wherein activating the force control module further comprises controlling a vacuum cup associated with the force control module, wherein:
   the vacuum cup is configured to be selectively activated to apply a force to the structure; and
   the vacuum cup is configured to be selectively deactivated to reduce the force applied to the structure.

6. A contour control system comprising a force control module and a control system, the control system configured to:
   obtain actual contour data;
   receive target contour data associated with a desired structure;
   compare the actual contour data and the target contour data;
   determine that the actual contour data does not match the target contour data; and
   in response to the determining, determine a force to be applied to a structure by the force control module to control the location and configuration of a structure contour, wherein the force control module comprises an air cushion pad, and wherein the air cushion pad is configured to be selectively inflated to apply a force to the structure and selectively deflated to reduce the force applied to the structure.

7. The contour control system of claim 6, further comprising a contour measurement module configured to measure a location and configuration of a contour.

8. The contour control system of claim 6, further comprising a memory configured to store load data and contour data.

9. The contour control system of claim 6, wherein the force control module comprises a force sensor operative to detect a quantity of force between the structure and the force control module.

10. The contour control system of claim 6, wherein the force control module further comprises a vacuum cup, wherein:
    the vacuum cup is configured to be selectively activated to apply a force to the structure; and
    the vacuum cup is configured to be selectively deactivated to reduce the force applied to the structure.

11. The contour control system of claim 6, wherein the force control module comprises a structure support cradle for supporting the structure.

12. The contour control system of claim 11, further comprising a vacuum cup, wherein
    the air cushion pad is attached to the structure support cradle and is configured to be selectively inflated to apply a force to the structure, and selectively deflated to reduce the force applied to the structure; and
    the vacuum cup is configured to be selectively activated to apply a force to the structure, and selectively deactivated to reduce the force applied to the structure.

13. The contour control system of claim 6, further comprising a contour data repository for storing the target contour data.

14. The contour control system of claim 13, wherein the contour data repository is further configured to store load data, the load data indicating a force to be applied to the structure by the force control module.

15. The contour control system of claim 14, wherein the load data comprises data determined by a first entity, and wherein the contour control system is used by a second entity.

16. The contour control system of claim 13, wherein:
    the force control module comprises a force sensor operative to detect a quantity of force between the structure and the force control module;
    the actual contour data comprises the quantity of force detected by the force sensor; and
    the control system is further configured to analyze a force detected by the force sensor and the load data to determine if a location and a configuration of a contour is within a pre-defined tolerance of the desired location and configuration of the contour.

17. The contour control system of claim 6, wherein the force control module further comprises a plurality of air pressure application cells, each of the air pressure application cells comprising:
    a force sensor;
    a plurality of contact surfaces; and
    a pressurized air intake port.

18. A method for controlling a contour of a structure, the method comprising:
    receiving stored load data indicating a predicted force applied to the structure by a force application device to control the contour;
    obtaining, via a force sensor of a force control module, a structure load data indicating a force between the structure and the force control module;

determining that the structure load data is not substantially consistent with the stored load data;

determining a force to be applied by a force control module that allows the stored load data to be consistent with the structure load data; and activating the force control module to apply the determined force to the structure, wherein activating the force control module comprises controlling an air cushion pad configured to be selectively inflated to apply a force to the structure and selectively deflated to reduce the force applied to the structure, and wherein activating the force control module further comprises controlling a vacuum cup associated with the force control module, wherein:

the vacuum cup is configured to be selectively activated to apply a force to the structure; and the vacuum cup is configured to be selectively deactivated to reduce the force applied to the structure.

19. The method of claim 18, wherein activating the force control module further comprises controlling a plurality of air pressure application cells, each of the air pressure application cells comprising a force sensor, a plurality of contact surfaces, and a pressurized air intake port.

* * * * *